(12) United States Patent
Isota et al.

(10) Patent No.: US 10,008,327 B2
(45) Date of Patent: *Jun. 26, 2018

(54) MULTILAYER CERAMIC CAPACITOR

(71) Applicant: Murata Manufacturing Co., Ltd., Nagaokakyo-shi, Kyoto-fu (JP)

(72) Inventors: Shinya Isota, Nagaokakyo (JP); Tatsuya Izumi, Nagaokakyo (JP); Tomotaka Hirata, Nagaokakyo (JP); Yasuhiro Nishisaka, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 29 days.

This patent is subject to a terminal disclaimer.

(21) Appl. No.: 15/204,110

(22) Filed: Jul. 7, 2016

(65) Prior Publication Data

US 2017/0018358 A1    Jan. 19, 2017

(30) Foreign Application Priority Data

Jul. 17, 2015 (JP) .................................. 2015-143052
May 23, 2016 (JP) .................................. 2016-102132

(51) Int. Cl.
*H01G 4/12* (2006.01)
*C04B 35/49* (2006.01)
(Continued)

(52) U.S. Cl.
CPC ........... *H01G 4/1245* (2013.01); *C04B 35/49* (2013.01); *H01G 4/1227* (2013.01); *H01G 4/30* (2013.01);
(Continued)

(58) Field of Classification Search
CPC ...... H01G 4/1245; H01G 4/1227; H01G 4/30; C04B 35/49; C04B 2235/3208; C04B 2235/3213; C04B 2235/3215; C04B 2235/3224; C04B 2235/3227; C04B 2235/3229; C04B 2235/3239;
(Continued)

(56) References Cited

U.S. PATENT DOCUMENTS 7,312,172 B2   12/2007  Sasaki et al.
8,673,798 B2    3/2014  Nakamura
(Continued)

FOREIGN PATENT DOCUMENTS

JP          2015062216 A    4/2015
KR    10-2005-0093799 A    9/2005
(Continued)

*Primary Examiner* — Dion R Ferguson
(74) *Attorney, Agent, or Firm* — Arent Fox LLP

(57) ABSTRACT

A multilayer ceramic capacitor that includes a laminate which has a plurality of dielectric layers and a plurality of internal electrode layers respectively laminated. The dielectric layers are a perovskite type structure containing Ba, Sr, Zr, Ti and Hf, and optionally Ca, and further include V, wherein (number of moles of Sr)/(number of moles of Ba+number of moles of Ca+number of moles of Sr) is 0.6 to 0.95, (number of moles of Zr)/(number of moles of Zr+number of moles of Ti+number of moles of Hf) is 0.9 to 0.98, thicknesses of the dielectric layers are 1 μm or less, and an average particle size of dielectric particles constituting the dielectric layers is 0.8 μm or less.

20 Claims, 4 Drawing Sheets

(51) Int. Cl.
*H01G 4/30* (2006.01)
*H01G 4/008* (2006.01)

(52) U.S. Cl.
CPC ............... *C04B 2235/3208* (2013.01); *C04B 2235/3213* (2013.01); *C04B 2235/3215* (2013.01); *C04B 2235/3224* (2013.01); *C04B 2235/3227* (2013.01); *C04B 2235/3229* (2013.01); *C04B 2235/3239* (2013.01); *C04B 2235/3262* (2013.01); *C04B 2235/3418* (2013.01); *C04B 2235/5445* (2013.01); *C04B 2235/5454* (2013.01); *C04B 2235/6562* (2013.01); *C04B 2235/6583* (2013.01); *C04B 2235/72* (2013.01); *C04B 2235/768* (2013.01); *C04B 2237/785* (2013.01); *C04B 2237/595* (2013.01); *C04B 2237/70* (2013.01); *H01G 4/0085* (2013.01); *H01G 4/12* (2013.01)

(58) Field of Classification Search
CPC .... C04B 2235/3262; C04B 2235/3418; C04B 2235/5445; C04B 2235/5454
See application file for complete search history.

(56) References Cited

U.S. PATENT DOCUMENTS

| | | | |
|---|---|---|---|
| 9,312,069 B2 * | 4/2016 | Nishimura | ............... H01G 4/30 |
| 9,373,445 B2 * | 6/2016 | Okamoto | ............... H01G 4/30 |
| 2006/0234853 A1 | 10/2006 | Sasaki et al. | |
| 2010/0033895 A1 * | 2/2010 | Yao | ............... H01G 4/1227 |
| | | | 361/321.4 |
| 2012/0033344 A1 | 2/2012 | Nakamura | |
| 2014/0009864 A1 * | 1/2014 | Takashima | ............ C04B 35/4682 |
| | | | 361/301.4 |
| 2015/0055273 A1 | 2/2015 | Endo et al. | |
| 2015/0155099 A1 | 6/2015 | Nishimura et al. | |

FOREIGN PATENT DOCUMENTS

| | | |
|---|---|---|
| KR | 10-1189908 B1 | 10/2012 |
| KR | 10-2015-0036335 A | 4/2015 |

* cited by examiner

MULTILAYER CERAMIC CAPACITOR

CROSS REFERENCE TO RELATED APPLICATIONS

The present application claims priority to Japanese Patent Application No. 2015-143052, filed Jul. 17, 2015, and Japanese Patent Application No. 2016-102132, filed May 23, 2016, the entire contents of each of which are incorporated herein by reference.

BACKGROUND OF THE INVENTION

Field of the Invention

The present invention relates to a multilayer ceramic capacitor, and particularly to a multilayer ceramic capacitor which includes a laminate having a plurality of dielectric layers and a plurality of internal electrode layers respectively laminated, and external electrodes formed at end surfaces of the laminate so as to be electrically connected to the internal electrode layers.

Description of the Related Art

The multilayer ceramic capacitor includes a base body in which the dielectric layer and the internal electrode layer are alternately laminated. The internal electrode layer is configured in such a way that a pair of internal electrode layers are alternately exposed to both end surfaces of the base body. One of the internal electrode layers alternately laminated is electrically connected to an inner side of a terminal electrode formed so as to cover one end surface of the base body. The other of the internal electrode layers alternately laminated is electrically connected to an inner side of a terminal electrode formed so as to cover the other end surface of the base body. In this way, a capacitance is formed between terminal electrodes formed on both ends of the base body (Refer to JP 2015-62216 A).

SUMMARY OF THE INVENTION

In recent years, multilayer ceramic capacitors have been increasingly downsized. As the multilayer ceramic capacitors are downsized, the number of internal electrode layers within a laminate is restricted and a required capacitance cannot be attained. In order to increase the number of internal electrode layers in the restricted dimensions of the multilayer ceramic capacitor, it is required to further reduce the thickness of a dielectric layer sandwiched between internal electrode layers. On the other hand, as a thickness of the dielectric layer is more reduced, there is a problem that an insulation property, which is one of the factors of reliability of the multilayer ceramic capacitor, cannot be maintained.

In view of the above, it is a main object of the present invention to provide a multilayer ceramic capacitor which can realize a reduction of a thickness of the dielectric layer so that the number of internal electrode layers can be increased in the laminate whose dimensions are restricted, and which has high reliability.

The multilayer ceramic capacitor according to an aspect of the present invention Includes a laminate having a plurality of dielectric layers and a plurality of internal electrode layers respectively laminated, and having a first main surface and a second main surface opposed to each other in a lamination direction, a first side surface and a second side surface opposed to each other in a width direction orthogonal to the lamination direction, and a first end surface and a second end surface opposed to each other in a length direction orthogonal to the lamination direction and the width direction. A first external electrode covers the first end surface and extends from the first end surface so as to cover the first and second main surfaces and the first and second side surfaces. A second external electrode covers the second end surface and extends from the second end surface so as to cover the first and second main surfaces and the first and second side surfaces.

The dielectric layers comprise a perovskite type structure containing Ba, Sr, Zr, Ti and Hf, and optionally Ca, and further including V, wherein (number of moles of Sr)/(number of moles of Ba+number of moles of Ca+number of moles of Sr) is 0.6 to 0.95, (number of moles of Zr)/(number of moles of Zr+number of moles of Ti+number of moles of Hf) is 0.9 to 0.98, thicknesses of the dielectric layers are 1 μm or less, and an average particle size of dielectric particles constituting the dielectric layers is 0.8 μm or less.

A multilayer ceramic capacitor according to a further aspect of the present invention Includes a laminate having a plurality of dielectric layers and a plurality of internal electrode layers respectively laminated, and having a first main surface and a second main surface opposed to each other in a lamination direction, a first side surface and a second side surface opposed to each other in a width direction orthogonal to the lamination direction, and a first end surface and a second end surface opposed to each other in a length direction orthogonal to the lamination direction and the width direction. A first external electrode covers the first end surface and extends from the first end surface so as to cover the first and second main surfaces and the first and second side surfaces. A second external electrode covers the second end surface and extends from the second end surface so as to cover the first and second main surfaces and the first and second side surfaces.

When dissolving the laminate in a solvent, the dielectric layers comprise a perovskite type structure containing Ba, Sr, Zr, Ti and Hf, and optionally Ca, and further including V, wherein (number of moles of Sr)/(number of moles of Ba+number of moles of Ca+number of moles of Sr) is 0.6 to 0.95, (number of moles of Zr)/(number of moles of Zr+number of moles of Ti+number of moles of Hf) is 0.9 to 0.98, thicknesses of the dielectric layers are 1 μm or less, and an average particle size of dielectric particles constituting the dielectric layer is 0.8 μm or less.

In the multilayer ceramic capacitor according to the present invention, the laminate preferably has a dimension in the length direction of 0.25 mm or less, a dimension in the lamination direction of 0.125 mm or less, and a dimension in the width direction of 0.125 mm or less.

Further, in the multilayer ceramic capacitor according to the present invention, it is preferred that an average particle size of the dielectric particles is 0.6 μm or less, the dielectric layer further contains Si and Mn, and (number of moles of Si)/(number of moles of Mn) is not less than 0.8 and not more than 1.0.

Further, in the multilayer ceramic capacitor according to the present invention, a Cv value represented by (standard deviation of dielectric-particle size)/(average particle size of dielectric particle)×100 is preferably 47% or less.

In the multilayer ceramic capacitor according to the present invention, it is preferred that the dielectric layer contains Si and Mn, and further contains at least one of La, Ce, Pr and Nd denoted by Re, wherein (number of moles of Ba+number of moles of Ca+number of moles of Sr+number of moles of Re)/(number of moles of Zr+number of moles of Ti+number of moles of Hf) is not less than 1.00 and not more than 1.03, (number of moles of Ba)/(number of moles of Ba+number of moles of Ca+number of moles of Sr) is not less than 0.05 and not more than 0.40, (number of moles of Ca)/(number of moles of Ba+number of moles of Ca+number of moles of Sr) is not less than 0.00 and not more than 0.35, (number of moles of Ti)/(number of moles of Zr+number of moles of Ti+number of moles of Hf) is not less than 0.02 and not more than 0.10, (number of moles of Si)/(number of moles of Zr+number of moles of Ti+number of moles of Hf) is not less than 0.1 and not more than 4.0, (number of moles of Mn)/(number of moles of Zr+number of moles of Ti+number of moles of Hf) is not less than 0.1 and not more than 4.0, (number of moles of V)/(number of moles of Zr+number of moles of Ti+number of moles of Hf) is not less than 0.01 and not more than 0.3, and (number of moles of Re)/(number of moles of Zr+number of moles of Ti+number of moles of Hf) is not less than 0.0 and not more than 3.0.

Further, in the multilayer ceramic capacitor according to the present invention, the dielectric layer preferably does not contain Al.

Further, a slurry obtained by mixing raw material powders of dielectric ceramic materials according to the present invention is a raw material slurry wherein an agglomerated particle size (D50) of the raw material powders including Ba, Ca, Sr, Zr, Ti or Hf is 150 nm or less.

Further, the perovskite type structure obtained by synthesizing the above-mentioned raw material powder is a perovskite type structure for the multilayer ceramic capacitor according to any one of the above-mentioned multilayer ceramic capacitors, and further includes V.

In a first main component powder including the perovskite type structure, an integration width of a (202) diffraction peak by powder X-ray diffraction is 0.28° or less.

In the multilayer ceramic capacitor according to the present invention, the thickness of the dielectric layer can be reduced and insulation properties of the dielectric layer can be improved.

In accordance with the present invention, even when dimensions of the multilayer ceramic capacitor are restricted, the dielectric layer can be made thin and insulation properties of the dielectric layer can be improved, and therefore the number of the internal electrode layers within the laminate can be increased. Accordingly, a large capacitance can be achieved in restricted dimensions, and a multilayer ceramic capacitor having high reliability can be attained.

These and other objects, characteristics and advantages of the invention will become more apparent in the following detailed description which is made in reference to the drawings.

DETAILED DESCRIPTION OF THE INVENTION

Figure 1:
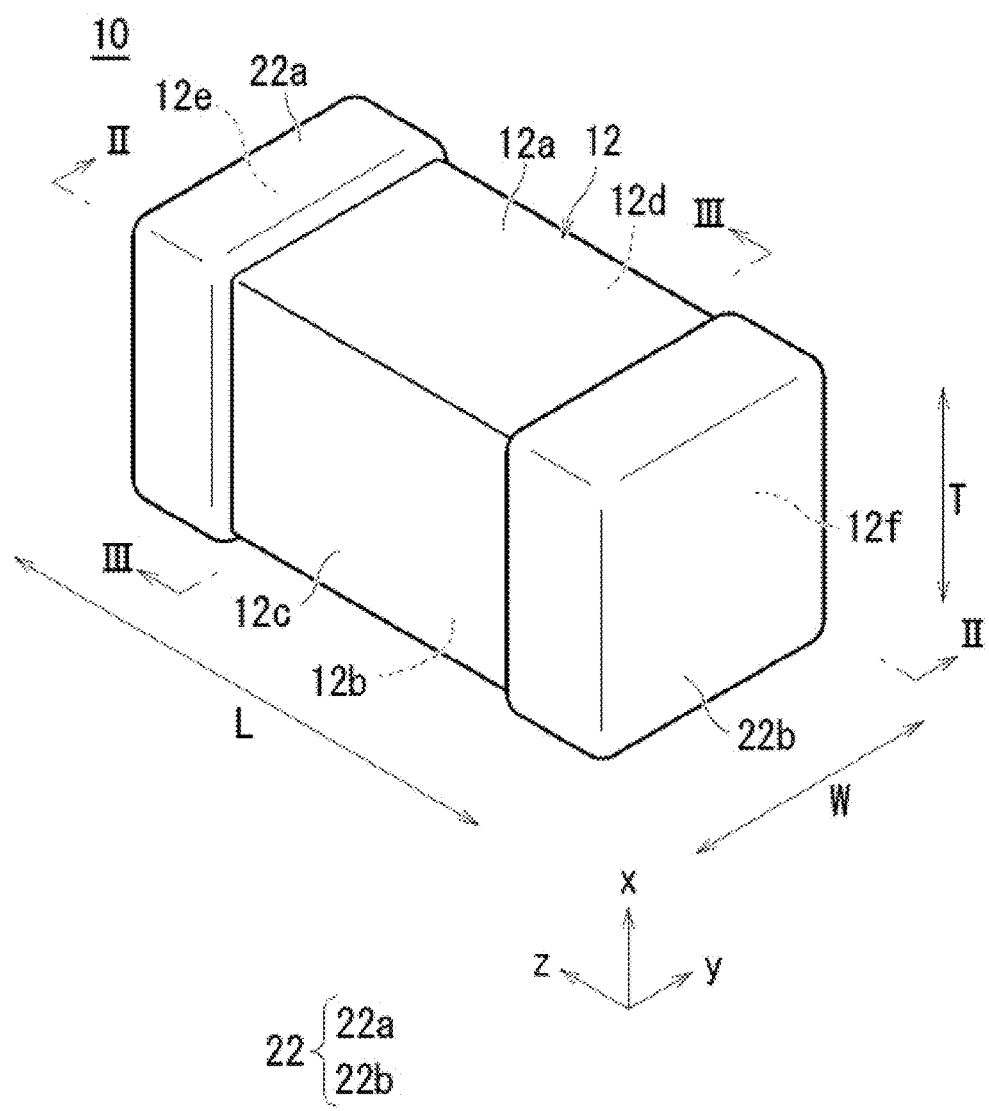
FIG. 1 is a perspective view showing an example of a multilayer ceramic capacitor according to the present invention.
Figure 2:
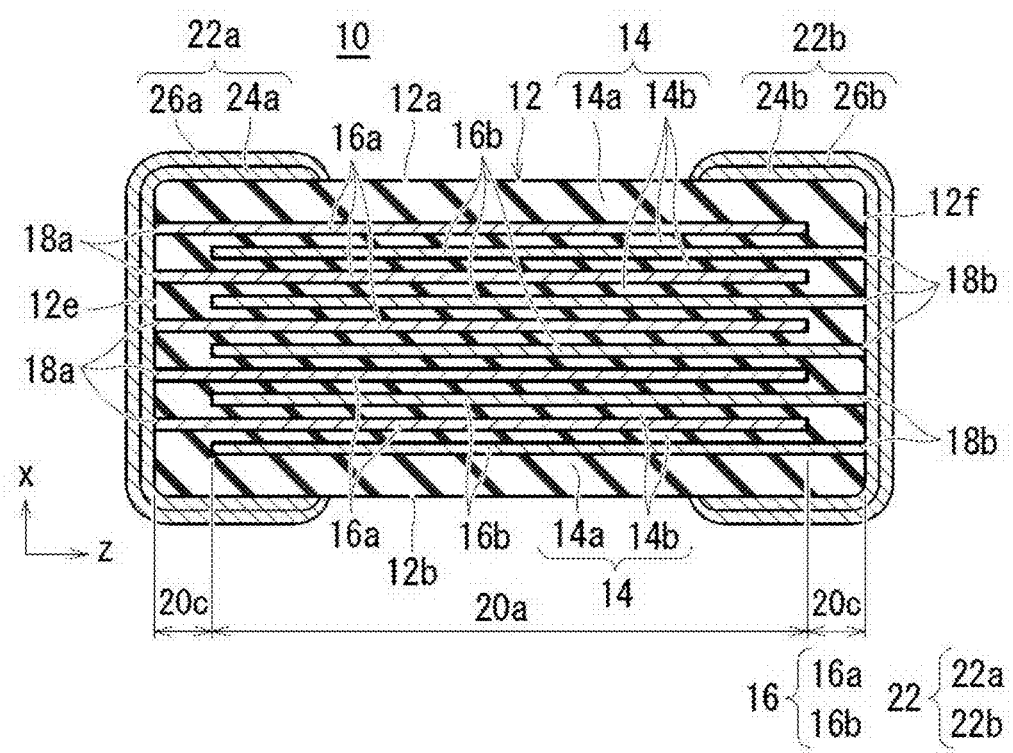
FIG. 2 is a sectional view of the multilayer ceramic capacitor shown in FIG. 1 taken on the line II-II.
Figure 3:
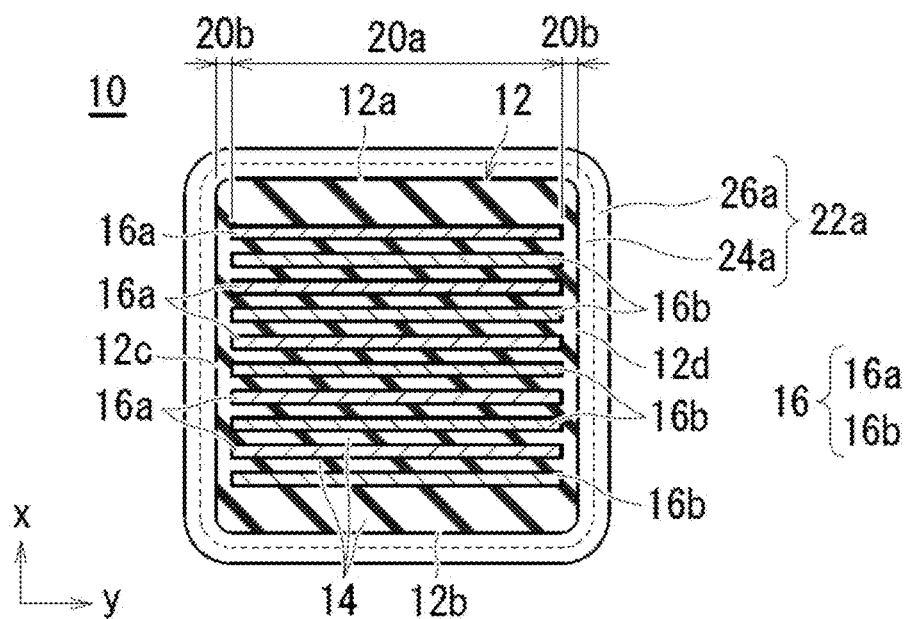
FIG. 3 is a sectional view of the multilayer ceramic capacitor shown in FIG. 1 taken on the line III-III.

As shown in FIG. 1, FIG. 2 and FIG. 3, a multilayer ceramic capacitor 10 includes, for example, a laminate 12 with a cuboid shape. The laminate 12 has a plurality of dielectric layers 14 and a plurality of internal electrode layers 16 respectively laminated. Moreover, the laminate 12 has a first main surface 12a and a second main surface 12b opposed to each other in a lamination direction x, a first side surface 12c and a second side surface 12d opposed to each other in a width direction y orthogonal to the lamination direction x, and a first end surface 12e and a second end surface 12f opposed to each other in a length direction z orthogonal to the lamination direction x and the width direction y. A corner portion and an edge line portion of the laminate 12 are preferably rounded. Note that, the corner portion refers to a portion at which three neighboring planes of the laminate intersect, and the edge line portion refers to a portion at which two neighboring planes of the laminate intersect.

A dimension in the lamination direction of the dielectric layer 14 is not less than 0.3 μm and not more than 1.0 μm. The dielectric layer 14 includes an outer layer portion 14a and an inner layer portion 14b. The outer layer portions 14a is positioned on the first main surface 12a side and the second main surface 12b side of the laminate 12, and is a dielectric layer 14 positioned between the first main surface 12a and the internal electrode layer 16 closest to the first main surface 12a, and a dielectric layer 14 positioned between the second main surface 12b and the internal electrode layer 16 closest to the second main surface 12b. A region sandwiched between both outer layer portions 14a is the inner layer portion 14b. A dimension in the lamination direction of the outer layer portion 14a is preferably not less than 15 μm and not more than 20 μm. In addition, the dimensions of the laminate 12 are 0.25 mm or less in a length direction L, 0.125 mm or less in a width direction W, and 0.125 mm or less in a thickness direction T.

As shown in FIG. 2 and FIG. 3, the laminate 12 has, for example, a plurality of first internal electrode layers 16a and a plurality of second internal electrode layers 16b respectively having a substantially rectangular shape, as the plurality of internal electrode layers 16. The plurality of the first internal electrode layers 16a and the plurality of the second internal electrode layers 16b are buried so as to be alternately arranged at regular intervals along the lamination direction x of the laminate 12.

The laminate 12 has a lead-out electrode portion 18a led out to the first end surface 12e of the laminate 12 on an end of the first internal electrode layer 16a. The laminate 12 has a lead-out electrode portion 18b led out to the second end surface 12f of the laminate 12 on one end of the second internal electrode layer 16b. Specifically, the lead-out electrode portion 18a on the one end side of the first internal electrode layer 16a is exposed to the first end surface 12e of the laminate 12. Further, the lead-out electrode portion 18b on the one end side of the second internal electrode layer 16b is exposed to the second end surface 12f of the laminate 12.

The laminate 12 includes a counter electrode portion 20a in which the first internal electrode layer 16a and the second internal electrode layer 16b are opposed to each other in the inner layer portion 14b of the dielectric layer 14. Further, the laminate 12 includes a side portion 20b of the laminate 14 (hereinafter, referred to as a "W gap") formed between one end in the width direction W of the counter electrode portion 20a and the first side surface 12c and between the other end in the width direction W of the counter electrode portion 20a and the second side surface 12d. Moreover, the laminate 14 includes an end 20c of the laminate 14 (hereinafter, referred to as a "L gap") formed between an end opposite to the lead-out electrode portion 18a of the first internal electrode layer 16a and the second end surface 12f, and between an end opposite to the lead-out electrode portion 18b of the second internal electrode layer 16b and the first end surface 12e.

Herein, a length of the L gap 20c of the end of the laminate 12 is preferably not less than 20 µm and not more than 40 µm. Further, a length of the W gap 20b of the side portion of the laminate 12 is preferably not less than 15 µm and not more than 20 µm.

The dielectric layer 14 in the laminate 12 includes a perovskite type structure containing Ba, Zr, Ti and Hf and optionally Ca, and further includes V. Among these components, ratios of Sr and Zr are particularly high, and (number of moles of Sr)/(number of moles of Ba+number of moles of Ca+number of moles of Sr) is 0.6 to 0.95, and (number of moles of Zr)/(number of moles of Zr+number of moles of Ti+number of moles of Hf) is 0.9 to 0.98.

Further, the perovskite type structure contains Si, Mn and Re, and Re is a component containing any one of La, Ce, Pr and Nd. In this case, (number of moles of Ba+number of moles of Ca+number of moles of Sr+number of moles of Re)/(number of moles of Zr+number of moles of Ti+number of moles of Hf) is not less than 1.00 and not more than 1.03, (number of moles of Ba)/(number of moles of Ba+number of moles of Ca+number of moles of Sr) is not less than 0.05 and not more than 0.40, (number of moles of Ca)/(number of moles of Ba+number of moles of Ca+number of moles of Sr) is not less than 0.00 and not more than 0.35, (number of moles of Ti)/(number of moles of Zr+number of moles of Ti+number of moles of Hf) is not less than 0.02 and not more than 0.10, (number of moles of Si)/(number of moles of Zr+number of moles of Ti+number of moles of Hf) is not less than 0.1 and not more than 4.0, (number of moles of Mn)/(number of moles of Zr+number of moles of Ti+number of moles of Hf) is not less than 0.1 and not more than 4.0, (number of moles of V)/(number of moles of Zr+number of moles of Ti+number of moles of Hf) is not less than 0.01 and not more than 0.3, and (number of moles of Re)/(number of moles of Zr+number of moles of Ti+number of moles of Hf) is not less than 0.0 and not more than 3.0.

Further, the dielectric-particle size is 0.8 µm or less; and with the dielectric-particle in the size is 0.6 µm or less, the thickness of the dielectric layer 14 can be further reduced. Herein, the (number of moles of Si)/(number of moles of Mn) is preferably not less than 0.8 and not more than 1.0. Further, the dielectric layer 14 preferably does not contain Al. Further, the dielectric-particle size is 0.34 µm or more.

Figure 4:
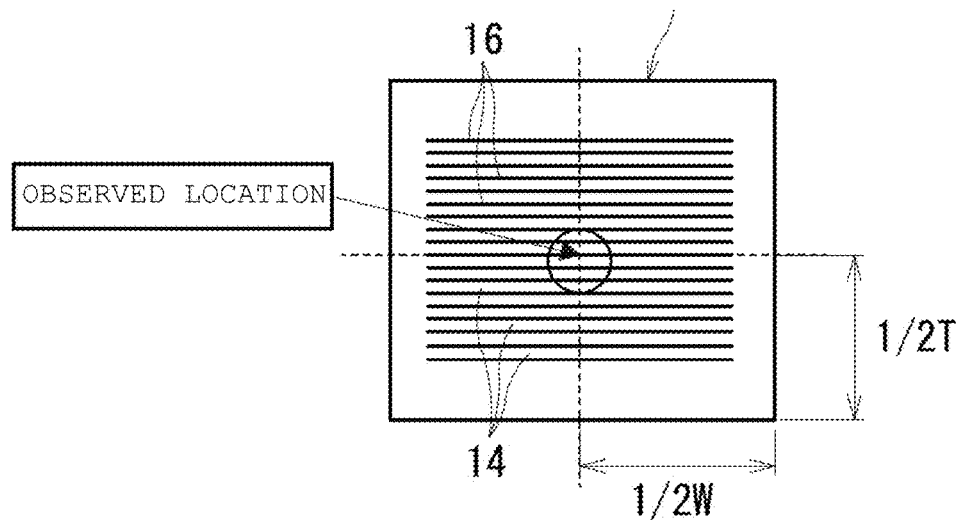
FIG. 4 is an illustrated diagram showing an observation point of the dielectric particle in a cross-section of a laminate to be used for the multilayer ceramic capacitor of the present invention.

In order to determine the dielectric-particle size, a sample is broken so that a cross-section including the width direction W and the thickness direction T (hereinafter, referred to as a "WT cross-section") at a position of about a half of the length direction L of the laminate 12 is exposed. Next, in order to make a boundary between dielectric particles (hereinafter, referred to as a "grain boundary") in the ceramic clear, the sample is heat-treated. As a temperature of heat treatment, a temperature at which a grain does not grow and the grain boundary becomes clear is selected, and in the present example, the sample is treated at 1000° C. In the sample thus prepared, the dielectric particles in the dielectric layer 14 are observed at a magnification of 10000 times at a position of about a half of each of the width direction W and the thickness direction T of the WT cross-section of the laminate 12, as shown in FIG. 4, using a scanning electron microscope (SEM). 100 grains are extracted from the resulting SEM image at random, and an area of an inside portion of the grain boundary of each dielectric particle is determined by image analysis to calculate an equivalent circle diameter, and the equivalent circle diameter is take as a particle size. A typical value of the particle size is calculated in terms of a volume-average particle size. Further, a Cv value is calculated by dividing a standard deviation of a particle size of 100 dielectric particles by an average particle size. Herein, the Cv value refers to a coefficient of variance determined by an equation: Cv value (%)=(standard deviation/average value)×100. The Cv value is preferably 47% or less. Results obtained in Examples described later are shown in Table 1 and Table 2.

The internal electrode layer 16 contains a metal such as Ni, Cu, Ag, Pd, Ag—Pd alloy, and Au. The internal electrode layer 16 may further contain dielectric particles having the same composition as that of ceramics contained in the dielectric layer 14. The number of the internal electrode layers 16 is preferably 50 or less. The thickness of the internal electrode layer 16 is preferably not less than 0.7 µm and not more than 0.3 µm. The first internal electrode layer 16a and the second internal electrode layer 16b include a counter electrode portion 20a in which the first internal electrode layer 16a and the second internal electrode layer 16b are opposed to each other, and the lead-out electrode portions 18a and 18B led out from the counter electrode portion 20a to the first end surface 12e and the second end surface 12f of the laminate 12.

External electrodes 22 are formed on the first end surface 12e side and the second end surface 12f side of the laminate 12. The external electrode 22 has a first external electrode 22a and a second external electrode 22b.

The first external electrodes 22a is formed on the first end surface 12e side of the laminate 12. The first external electrodes 22a covers the first end surface 12e of the laminate 12, extends from the first end surface 12e, and formed so as to partially cover the first main surface 12a, the second main surface 12b, the first side surface 12c and the second side surface 12d. In this case, the first external electrodes 22a is electrically connected to the lead-out electrode portion 18a of the first internal electrode layer 16a.

The second external electrodes 22b is formed on the second end surface 12f side of the laminate 12. The second external electrodes 22b covers the second end surface 12f of the laminate 12, extends from the second end surface 12f, and formed so as to partially cover the first main surface 12a, the second main surface 12b, the first side surface 12c and the second side surface 12d. In this case, the second external electrodes 22b is electrically connected to an lead-out electrode portion 18b of the second internal electrode layer 16b.

In the laminate 12, the first internal electrode layer 16a and the second internal electrode layer 16b are opposed to each other with the dielectric layer 14 interposed therebetween in each counter electrode portion 20a, and thereby, a capacitance is formed. Therefore, the capacitance can be obtained between the first external electrode 22a to which the first internal electrode layer 16a is connected and the second external electrode 22b to which the second internal electrode layer 16b is connected. Accordingly, a laminated ceramic electronic component having such a structure functions as a capacitor.

Figure 5:
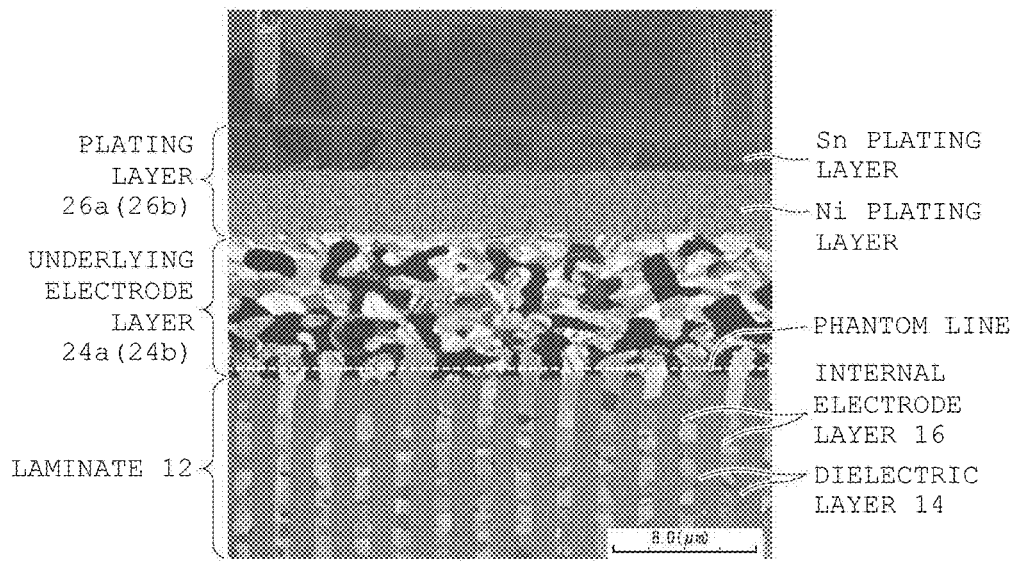
FIG. 5 shows an electron micrograph image of a cross-section of an example of a multilayer ceramic capacitor of the present invention.

As shown in FIG. 5, the first external electrode 22a has an underlying electrode layer 24a and a plating layer 26a in this order from a laminate 12 side. Similarly, the second external electrode 22b has an underlying electrode layer 24b and a plating layer 26b in this order from a laminate 12 side.

While each of the underlying electrode layers 24a and 24b includes at least one selected from among a baking layer, a resin layer, and a thin film layer, underlying electrode layers 24a and 24b comprising the baking layer will be described herein.

The baking layer includes glass containing Si, and Cu as a metal. The baking layer is formed by applying an electroconductive paste including glass and metal onto the laminate 12 and baking the paste, and the paste is baked after firing the dielectric layer 14 and the internal electrode layer 16 by firing. A thickness of the thickest portion of the baking layer is preferably not less than 5 μm and not more than 25 μm.

A resin layer containing electroconductive particles and a thermosetting resin may be formed on the baking layer. A thickness of the thickest portion of the resin layer is preferably not less than 5 μm and not more than 25 μm. Further, as the plating layers 26a and 26b, for example, at least one selected from among Cu, Ni, Sn, Ag, Pd, Ag—Pd alloy, Au and the like is used.

The plating layers 26a and 26b may be formed of a plurality of layers. The plating layers 26a and 26b preferably have a two-layer structure of a Ni-plating layer formed on the baking layer and a Sn-plating layer formed on the Ni-plating layer. The Ni-plating layer is used for preventing the underlying electrode layers 24a and 24b from being eroded by solder while mounting the laminated ceramic electronic component, and the Sn-plating layer is used for improving wettability of solder while mounting the laminated ceramic electronic component to enable easy mounting.

The thickness per the plating layer is preferably not less than 1 μm and not more than 8 μm.

In addition, the laminate has a dimension in the length direction L that is not less than 0.18 mm and not more than 0.32 mm, a dimension in the width direction W that is not less than 0.09 mm and not more than 0.18 mm, and a dimension in the thickness direction T that is not less than 0.09 mm and not more than 0.240 mm. Target values of the dimensions are 0.25 mm or less for the dimension in the length direction L, 0.125 mm or less for the dimension in the width direction W, and 0.125 mm or less for the dimension in the thickness direction T. The dimensions of the laminate can be measured with a microscope.

Further, an average thickness of each of the above-mentioned plurality of conductive material layers and plurality of dielectric layers is measured as follows. First, a multilayer ceramic capacitor 10 is polished so that a cross-section including the length direction L and the thickness direction T of the laminate (hereinafter, referred to as a "LT cross-section") is exposed. By observing the LT cross-section with a scanning electron microscope, a thickness of each portion is measured. In this case, thicknesses on total 5 lines, namely a center line passing through a center of the cross-section of the laminate 12 in a thickness direction T and 4 lines drawn from the center line toward both sides, are measured. An average value of these 5 measurements is considered as an average thickness of each portion. In order to obtain a more accurate average thickness, the above-mentioned 5 measurements are determined for each of an upper portion, an intermediate portion and a lower portion in the thickness direction T, and an average value of these measurements is considered as an average thickness of each portion.

With respect to the multilayer ceramic capacitor 10 thus obtained, the Cu crystal in the external electrode 22 can be observed as follows.

First, the multilayer ceramic capacitor 10 is polished so as to expose the LT cross-section including the external electrode 22. Here, metal sag is preferably removed in order to avoid causing metal sag of the external electrode 22 due to polishing. Then, a cross-section including the underlying electrode layers 24a and 24b is imaged by a scanning ion electron microscope (SIM).

A Cu crystal having a different crystal orientation of crystals of Cu looks different on the SIM. In addition, when a contrast looks the same, the contrast is adjusted. An average length of demarcation lines of the Cu crystals is calculated by measuring a length of an interface of the Cu crystal having a different contrast. In addition, when it is difficult to measure lengths of demarcation lines of all Cu crystals, a method in which a phantom line is drawn substantially parallel to the end surface of the laminate 12 and lengths of demarcation lines of the Cu crystals present on the phantom line are measured may be an alternative method. In the multilayer ceramic capacitor 10, by setting a demarcation line of the Cu crystal to 3 μm or less, the contact property between the internal electrode layer 16 and the external electrode 22 can be improved.

Further, a phantom line is drawn substantially parallel to the end surface in a confine within 2 μm from the first end surface 12e and the second end surface 12f of the laminate 12, and the number of pieces of glass present on the straight line is counted, and thereby how many pieces of glass contained in the underlying electrode layers 24a and 24b are in contact with the laminate 12 is found. When the number of pieces of glass is 5 or more, the fixing force between the underlying electrode layers 24a and 24b and the laminate 12 is increased. However, when the number of pieces of glass is less than 5, the fixing force between the external electrode 22 and the internal electrode layer 16 is deteriorated.

Next, a production process of the multilayer ceramic capacitor 10 will be described. First, raw material powders of $SrCO_3$, $BaCO_3$, $CaCO_3$, $ZrO_2$, $TiO_2$, and $Re_2O_3$, respectively having a purity of 99% or more, are prepared as materials constituting a main component of the dielectric layer 14. Herein, Re is at least one selected from among La, Ce, Pr and Nd. These materials are weighed, and then wet-mixed by a ball mill. In this process, in each of the raw material powders, a particle size at which a cumulative value from a small particle size side reaches 50% is 150 nm or less. That cumulative value from a small particle size side is 50% or less is referred to as being 150 nm or less in agglomerated particle size (D50), herein. Thereafter, the materials are dried and pulverized. A powder thus obtained is calcined at a temperature of 1100° C. or higher and 1300° C. or lower for 2 hours in the atmosphere, and then pulverized to obtain a first main component powder. The first main component powder has a perovskite type structure, and an integration width of a (202) diffraction peak by powder X-ray diffraction is 0.28° or less. In addition, a method for producing the main component is not particularly limited, and examples thereof include a solid phase method and a hydrothermal method, and the material of the main component is not particularly limited, and examples thereof include carbonates, oxides, hydroxides, chlorides and the like. Further, the main component may contain inevitable impurities such as $HfO_2$. In addition, $Re_2O_3$ may be added later as an additive.

Subsequently, as additive materials, powders of $SiO_2$, $MnCO_3$, $Re_2O_3$, and $V_2O_5$ are prepared, a powder of a main component and these additive materials are weighed, wet-mixed with a ball mill, and then dried/pulverized to obtain a raw material powder. Further, $CaCO_3$, $SrCO_3$, $BaCO_3$, $TiO_2$ and $ZrO_2$ may be added at this stage for adjusting mole ratios or the like.

To the obtained raw material powder, a polyvinyl butyral-based binder and an organic solvent such as toluene or ethanol are added, and the resulting mixture is wet-mixed with a ball mill to prepare a dielectric slurry. In addition, higher dispersibility can be achieved by using a minute bead diameter in dispersing the powder. Using the dielectric slurry thus obtained, a sheet is formed by a doctor blade method and cut, and thereby a ceramic green sheet can be prepared.

Next, electroconductive pastes for a dielectric sheet and an internal electrode thus obtained are prepared. The electroconductive paste for a dielectric sheet and an internal electrode include a binder and a solvent, and publicly known organic binder and organic solvent can be used.

The electroconductive paste for an internal electrode is applied on the dielectric sheet in a predetermined pattern by, for example, screen printing or gravure printing, and thereby an internal electrode pattern is formed.

Moreover, a predetermined number of dielectric sheets for an outer layer in which the internal electrode pattern is not formed are laminated, dielectric sheets in which the internal electrode pattern is formed are laminated in turn thereon, and a predetermined number of dielectric sheets for an outer layer are laminated thereon to prepare a laminated sheet.

By pressing the prepared laminated sheet in the lamination direction by means such as isostatic press, a laminated block is prepared.

Next, the laminated block is cut to a predetermined size and a laminated chip is cut out. In this process, a corner portion and an edge line portion of the laminated chip may be rounded by barrel polishing or the like.

Moreover, by firing the laminated chip, a laminate 12 is prepared.

The electroconductive paste for an external electrode is applied onto both end surfaces of the prepared laminate 12, and baked to form a baking layer of the external electrode. A baking temperature at this time is preferably 700° C. or higher and 900° C. or lower.

The electroconductive paste for an external electrode includes a Cu powder, and the Cu powder is formed by a liquid phase reduction method. A size of the Cu powder is a particle size of 2 μm or less.

A slower sintering rate of the electroconductive paste for an external electrode is preferred. Therefore, an oxide is preferably scattered around of the Cu powder within the electroconductive paste or on the inner side of the Cu powder. Such an oxide includes oxides of Zr, Al, Ti or Si, and particularly oxides of Zr and Al are preferred.

Moreover, as required, the surface of the baking layer of the electroconductive paste for an external electrode is plated.

In the multilayer ceramic capacitor 10, since the dielectric layer 14 comprises of a perovskite type structure including Ba, Sr, Zr, Ti and Hf, and optionally Ca, and further includes V, and a ratio of number of moles of Sr to the total number of moles of other components and a ratio of number of moles of Zr to the total number of moles of other components are set within predetermined ranges, a thickness of the dielectric layer 14 can be reduced to 1 μm or less, and an average particle size of the dielectric particles constituting the dielectric layer 14 can be reduced to 0.8 μm or less. Thereby, the thickness of the dielectric layer 14 can be reduced and insulation properties of the dielectric layer 14 can be improved.

Therefore, even when dimensions of the multilayer ceramic capacitor 10 are restricted, the dielectric layer 14 can be made thin and insulation properties of the dielectric layer 14 can be improved, and therefore number of the internal electrode layers 16 within the laminate 12 can be increased. Accordingly, a large capacitance can be achieved in restricted dimensions, and a multilayer ceramic capacitor 10 having high reliability can be attained.

Further, by reducing the average particle size of the dielectric particles contained in the dielectric layer 14 to 0.6 μm or less, the dielectric layer 14 can be further made thin, and it is possible to attain an excellent insulation degradation life and moisture load life at a high electric field even in a thinner layer.

Here, Si and Mn contained in the dielectric layer, a value of (number of moles of Si)/(number of moles of Mn) is not less than 0.8 and not more than 1.0, and thereby a segregation phase comprising Si, Mn and Ca can be formed at a triple point and a low-resistance component at a grain boundary portion is discharged, and therefore resistance can be increased.

Further, since a Cv value represented by (standard deviation of dielectric-particle size)/(average particle size of dielectric particle)×100 is preferably 47% or less, a grain boundary area contained in the dielectric layer 14 is increased and a withstand voltage can be increased.

Moreover, since the perovskite type structure constituting the dielectric layer contains Si, Mn and Re, and a ratio of number of moles of each component constituting the perovskite type compound is within the range according to claim 5, the thickness of the dielectric layer 14 can be reduced and insulation properties of the dielectric layer 14 can be improved. In addition, Si and Mn are distributed throughout the dielectric layer in a state of segregation together with Ca.

Further, since the dielectric layer does not contain Al, the segregation phase comprising Si, Mn and Ca can be preferentially formed and resistance of a grain boundary portion can be increased.

Moreover, with respect to a slurry obtained by mixing raw material powders of dielectric ceramic materials for preparing the multilayer ceramic capacitor 10, since an agglomerated particle size (D50) of the raw material powders is 150 nm or less and in the first main component powder including the perovskite type structure obtained by synthesizing the raw material powders, an integration width of a (202) diffraction peak by powder X-ray diffraction is 0.28° or less, abnormal grain growth of the dielectric particle can be suppressed, and a grain boundary area contained in the dielectric layer 14 is increased and a withstand voltage can be increased.

The above-mentioned effects will become apparent from the following examples.

Example

A multilayer ceramic capacitor was prepared using the above-mentioned production method. Here, materials constituting a main component of the dielectric layer and additive materials were weighed so as to be charge values shown in Table 1 and Table 2. In addition, in Tables, a sample marked with an asterisk is out of the scope of the present invention. Then, the resulting raw material powder was subjected to ICP analysis, and consequently it was confirmed that analysis results are almost the same as formulation composition shown in Table 1 and Table 2.

With respect to a dielectric slurry formed by mixing raw material powders, a binder and an organic solvent, it was confirmed that an integration width of a (202) diffraction peak by powder X-ray diffraction of the dielectric slurry is 0.28° or less.

When the dielectric slurry was formed into a sheet and cut, rectangular ceramic green sheets having a size of 15 cm long, 15 cm wide and 4 μm thick or 15 cm long, 15 cm wide and 2 μm thick were formed.

As an electroconductive paste for an internal electrode, a paste including 100 parts by weight of Ni powder as a metal powder, 7 parts by weight of ethylcellulose as an organic vehicle and terpineol as a solvent was used.

Further, when firing a multi-layer chip, the multi-layer chip was heated at a temperature of 250° C. in the atmosphere to burn the binder, and then fired at a temperature raising rate of 3.33 to 200° C./min under the conditions of a maximum temperature of 1200 to 1300° C. and an oxygen partial pressure log $P_{O2}$=-9.0 to -11.0 MPa to obtain a ceramic sintered body. In addition, the resulting sintered body was subjected to ICP analysis, and consequently it was confirmed that analysis results are almost the same as formulation composition shown in Table 1 and Table 2.

In addition, the resulting laminate was subjected to structural analysis based on XRD (X-ray diffraction), and consequently it becomes apparent that the main component has a perovskite type structure of a barium titanate base.

The multilayer ceramic capacitor thus obtained was evaluated as follows.

Initial Short-Circuit Ratio 100 samples of the multilayer ceramic capacitor were measured. Herein, a chip in which a logarithmic value log IR of initial insulation resistance is 6 or less was counted as a short-chip. The results thereof are shown in Table 3 and Table 4.

Accelerated Moisture and Load Test (PCBT)

100 samples of the multilayer ceramic capacitor were put in the conditions of temperature of 120° C., humidity of 100% RH, pressure of 202.65 kPa and applied voltage of 50 V, and after a lapse of 250 hours, a logarithmic value log IR of insulation resistance of the multilayer ceramic capacitor was measured, and the number of the multilayer ceramic capacitors in which a value of the log IR is 6 or less was counted. The results thereof are shown in Table 3 and Table 4.

High-Temperature Load Life 100 samples of the multilayer ceramic capacitor were put in the conditions of an applied voltage 75 V at a temperature of 150° C., an applied voltage 100 V at a temperature of 150° C. and an applied voltage 125 V at a temperature of 150° C., and after a lapse of 250 hours, a logarithmic value log IR of insulation resistance of the multilayer ceramic capacitor was measured, and the number of the multilayer ceramic capacitors in which a value of the log IR is 6 or less was counted. The results thereof are shown in Table 2 and Table 3. In addition, the applied voltage 75 V corresponds an electric field intensity of 75 kV/mm which is exerted on the multilayer ceramic capacitor, the applied voltage 100 V corresponds an electric field intensity of 100 kV/mm which is exerted on the multilayer ceramic capacitor, and the applied voltage 125 V corresponds an electric field intensity of 125 kV/mm which is exerted on the multilayer ceramic capacitor

TABLE 1

$100(Sr_vBa_wCa_x)_m(Zr_yTi_zHf_{1-y-z})O_3 + aSiO_2 + bMnO + cVO_{5/2} + dReO_{3/2}$

| Sample No. | v | w | x | y | z | m | a | b | c | d | a/b | Average Particle Size (μm) | Capacitance G/NG | Cv Value (%) |
|---|---|---|---|---|---|---|---|---|---|---|---|---|---|---|
| 1 | 0.65 | 0.20 | 0.15 | 0.93 | 0.06 | 1.02 | 1.00 | 1.50 | 0.10 | 0.00 | 0.67 | 0.65 | G | 55 |
| 2 | 0.65 | 0.20 | 0.15 | 0.93 | 0.06 | 1.02 | 1.00 | 1.50 | 0.10 | 0.00 | 0.67 | 0.70 | G | 53 |
| 3 | 0.65 | 0.20 | 0.15 | 0.93 | 0.06 | 1.02 | 1.00 | 1.50 | 0.10 | 0.00 | 0.67 | 0.75 | G | 51 |
| 4 | 0.65 | 0.20 | 0.15 | 0.93 | 0.06 | 1.02 | 1.00 | 1.50 | 0.10 | 0.00 | 0.67 | 0.80 | G | 52 |
| * 5 | 0.65 | 0.20 | 0.15 | 0.93 | 0.06 | 1.02 | 1.00 | 1.50 | 0.10 | 0.00 | 0.67 | 0.85 | G | 52 |
| * 6 | 0.65 | 0.20 | 0.15 | 0.93 | 0.06 | 1.02 | 1.00 | 1.50 | 0.10 | 0.00 | 0.67 | 0.90 | NG | 49 |
| * 7 | 0.97 | 0.03 | 0.00 | 0.92 | 0.07 | 1.02 | 1.00 | 1.20 | 0.10 | 0.00 | 0.83 | 0.89 | NG | 52 |
| 8 | 0.95 | 0.05 | 0.00 | 0.92 | 0.07 | 1.02 | 1.00 | 1.20 | 0.10 | 0.00 | 0.83 | 0.60 | G | 50 |
| 9 | 0.60 | 0.40 | 0.00 | 0.96 | 0.03 | 1.02 | 1.30 | 1.50 | 0.10 | 0.00 | 0.87 | 0.43 | G | 58 |
| * 10 | 0.58 | 0.42 | 0.00 | 0.96 | 0.03 | 1.02 | 1.30 | 1.50 | 0.10 | 0.00 | 0.87 | 0.32 | G | 61 |
| 11 | 0.60 | 0.05 | 0.35 | 0.94 | 0.05 | 1.02 | 1.20 | 1.50 | 0.10 | 0.00 | 0.80 | 0.42 | G | 58 |
| * 12 | 0.58 | 0.05 | 0.37 | 0.94 | 0.05 | 1.02 | 1.20 | 1.50 | 0.10 | 0.00 | 0.80 | 0.32 | G | 59 |
| * 13 | 0.95 | 0.05 | 0.00 | 0.88 | 0.12 | 1.02 | 1.00 | 1.50 | 0.10 | 0.00 | 0.67 | 0.89 | NG | 50 |
| 14 | 0.95 | 0.05 | 0.00 | 0.90 | 0.10 | 1.02 | 1.00 | 1.50 | 0.10 | 0.00 | 0.67 | 0.75 | G | 51 |
| 15 | 0.60 | 0.40 | 0.00 | 0.98 | 0.02 | 1.02 | 1.30 | 1.50 | 0.10 | 0.00 | 0.87 | 0.36 | G | 59 |
| * 16 | 0.60 | 0.40 | 0.00 | 1.00 | 0.00 | 1.02 | 1.30 | 1.50 | 0.10 | 0.00 | 0.87 | 0.24 | NG | 62 |
| * 17 | 0.65 | 0.20 | 0.15 | 0.93 | 0.06 | 1.05 | 1.30 | 1.50 | 0.10 | 0.00 | 0.87 | 0.24 | NG | 62 |
| 18 | 0.65 | 0.20 | 0.15 | 0.93 | 0.06 | 1.03 | 1.30 | 1.50 | 0.10 | 0.00 | 0.87 | 0.40 | G | 58 |
| 19 | 0.65 | 0.20 | 0.15 | 0.93 | 0.06 | 1.00 | 1.00 | 1.50 | 0.10 | 0.00 | 0.67 | 0.72 | G | 52 |
| * 20 | 0.65 | 0.20 | 0.15 | 0.93 | 0.06 | 0.98 | 1.00 | 1.50 | 0.10 | 0.00 | 0..67 | 0.91 | NG | 49 |
| * 21 | 0.65 | 0.20 | 0.15 | 0.93 | 0.06 | 1.02 | 0.00 | 0.10 | 0.10 | 0.00 | 0.00 | 0.22 | NG | 61 |
| 22 | 0.65 | 0.20 | 0.15 | 0.93 | 0.06 | 1.02 | 0.10 | 0.10 | 0.10 | 0.00 | 1.00 | 0.35 | G | 59 |
| 23 | 0.65 | 0.20 | 0.15 | 0.93 | 0.06 | 1.02 | 0.50 | 0.50 | 0.10 | 0.00 | 1.00 | 0.45 | G | 58 |

TABLE 1-continued $100(Sr_vBa_wCa_x)_m(Zr_yTi_zHf_{1-y-z})O_3 + aSiO_2 + bMnO + cVO_{5/2} + dReO_{3/2}$

| Sample No. | v | w | x | y | z | m | a | b | c | d | a/b | Average Particle Size (μm) | Capacitance G/NG | Cv Value (%) |
|---|---|---|---|---|---|---|---|---|---|---|---|---|---|---|
| 24 | 0.65 | 0.20 | 0.15 | 0.93 | 0.06 | 1.02 | 1.20 | 1.00 | 0.10 | 0.00 | 1.20 | 0.56 | G | 55 |
| 25 | 0.65 | 0.20 | 0.15 | 0.93 | 0.06 | 1.02 | 1.20 | 1.20 | 0.10 | 0.00 | 1.00 | 0.56 | G | 56 |
| 26 | 0.65 | 0.20 | 0.15 | 0.93 | 0.06 | 1.02 | 1.20 | 1.50 | 0.10 | 0.00 | 0.80 | 0.56 | G | 56 |
| 27 | 0.65 | 0.20 | 0.15 | 0.93 | 0.06 | 1.02 | 1.20 | 1.70 | 0.10 | 0.00 | 0.71 | 0.56 | G | 54 |
| 28 | 0.65 | 0.20 | 0.15 | 0.93 | 0.06 | 1.02 | 2.00 | 1.80 | 0.10 | 0.00 | 1.11 | 0.72 | G | 52 |
| 29 | 0.65 | 0.20 | 0.15 | 0.93 | 0.06 | 1.02 | 4.00 | 1.80 | 0.10 | 0.00 | 2.22 | 0.80 | G | 52 |
| * 30 | 0.65 | 0.20 | 0.15 | 0.93 | 0.06 | 1.02 | 4.20 | 1.80 | 0..10 | 0.00 | 2.33 | 1.01 | NG | 48 |

TABLE 2

$100(Sr_vBa_wCa_x)_m(Zr_yTi_zHf_{1-y-z})O_3 + aSiO_2 + bMnO + cVO_{5/2} + dReO_{3/2}$

| Sample No. | v | w | x | y | z | m | a | b | c | d | a/b | Average Particle Size (μm) | Capacitance G/NG | Cv Value (%) |
|---|---|---|---|---|---|---|---|---|---|---|---|---|---|---|
| * 31 | 0.65 | 0.20 | 0.15 | 0.93 | 0.06 | 1.02 | 0.10 | 0.00 | 0.10 | 0.00 | — | 0.22 | NG | 62 |
| 32 | 0.65 | 0.20 | 0.15 | 0.93 | 0.06 | 1.02 | 0.10 | 0.10 | 0.10 | 0.00 | 1.00 | 0.34 | G | 59 |
| 33 | 0.65 | 0.20 | 0.15 | 0.93 | 0.06 | 1.02 | 0.50 | 0.50 | 0.10 | 0.00 | 1.00 | 0.46 | G | 57 |
| 34 | 0.65 | 0.20 | 0.15 | 0.93 | 0.06 | 1.02 | 1.20 | 1.20 | 0.10 | 0.00 | 1.00 | 0.56 | G | 56 |
| 35 | 0.65 | 0.20 | 0.15 | 0.93 | 0.06 | 1.02 | 1.80 | 2.00 | 0.10 | 0.00 | 0.90 | 0.77 | G | 53 |
| 36 | 0.65 | 0.20 | 0.15 | 0.93 | 0.06 | 1.02 | 1.80 | 4.00 | 0.10 | 0.00 | 0.45 | 0.80 | G | 51 |
| * 37 | 0.65 | 0.20 | 0.15 | 0.93 | 0.06 | 1.02 | 1.80 | 4.20 | 0.10 | 0.00 | 0.43 | 0.92 | NG | 49 |
| * 38 | 0.65 | 0.20 | 0.15 | 0.93 | 0.06 | 1.02 | 1.30 | 1.50 | 0.00 | 0.00 | 0.87 | 0.46 | G | 56 |
| 39 | 0.65 | 0.20 | 0.15 | 0.93 | 0.06 | 1.02 | 1.30 | 1.50 | 0.01 | 0.00 | 0.87 | 0.44 | G | 57 |
| 40 | 0.65 | 0.20 | 0.15 | 0.93 | 0.06 | 1.02 | 1.30 | 1.50 | 0.08 | 0.00 | 0.87 | 0.48 | G | 56 |
| 41 | 0.65 | 0.20 | 0.15 | 0.93 | 0.06 | 1.02 | 1.30 | 1.50 | 0.14 | 0.00 | 0.87 | 0.52 | G | 54 |
| 42 | 0.65 | 0.20 | 0.15 | 0.93 | 0.06 | 1.02 | 1.30 | 1.50 | 0.20 | 0.00 | 0.87 | 0.63 | G | 53 |
| 43 | 0.65 | 0.20 | 0.15 | 0.93 | 0.06 | 1.02 | 1.30 | 1.50 | 0.30 | 0.00 | 0.87 | 0.77 | G | 52 |
| * 44 | 0.65 | 0.20 | 0.15 | 0.93 | 0.06 | 1.02 | 1.30 | 1.50 | 0.32 | 0.00 | 0.87 | 0.97 | NG | 49 |
| 45 | 0.65 | 0.20 | 0.15 | 0.93 | 0.06 | 1.02 | 1.00 | 1.50 | 0.80 | 0.50 | 0.67 | 0.62 | G | 53 |
| 46 | 0.65 | 0.20 | 0.15 | 0.93 | 0.06 | 1.02 | 1.00 | 1.50 | 0.80 | 1.00 | 0.67 | 0.61 | G | 52 |
| 47 | 0.65 | 0.20 | 0.15 | 0.93 | 0.06 | 1.02 | 1.00 | 1.50 | 0.80 | 1.50 | 0.67 | 0.66 | G | 52 |
| 48 | 0.65 | 0.20 | 0.15 | 0.93 | 0.06 | 1.02 | 1.00 | 1.50 | 0.80 | 2.00 | 0.67 | 0.75 | G | 52 |
| 49 | 0.65 | 0.20 | 0.15 | 0.93 | 0.06 | 1.02 | 1.00 | 1.50 | 0.80 | 3.00 | 0.67 | 0.79 | G | 51 |
| * 50 | 0.65 | 0.20 | 0.15 | 0.93 | 0.06 | 1.02 | 1.00 | 1.50 | 0.80 | 3.20 | 0..67 | 0.90 | G | 50 |
| ○ 51 | 0.65 | 0.20 | 0.15 | 0.93 | 0.06 | 1.02 | 1.00 | 1.50 | 0.10 | 0.00 | 0.67 | 0.78 | G | 37 |
| ○ 52 | 0.65 | 0.20 | 0.15 | 0.93 | 0.06 | 1.02 | 1.00 | 1.50 | 0.10 | 0.00 | 0.67 | 0.62 | G | 42 |
| ○ 53 | 0.65 | 0.20 | 0.15 | 0.93 | 0.06 | 1.02 | 1.00 | 1.50 | 0.10 | 0.00 | 0.67 | 0.60 | G | 47 |
| ⊙ 54 | 0.65 | 0.20 | 0.15 | 0.93 | 0.06 | 1.02 | 1.20 | 1.50 | 0.80 | 1.00 | 0.80 | 0.48 | G | 47 |
| ⊙ 55 | 0.65 | 0.20 | 0.15 | 0.93 | 0.06 | 1.02 | 1.30 | 1.50 | 0.80 | 1.00 | 0.87 | 0.60 | G | 43 |
| ⊙ 56 | 0.65 | 0.20 | 0.15 | 0.93 | 0.06 | 1.02 | 1.50 | 1.50 | 0.80 | 1.00 | 1.00 | 0.52 | G | 44 |
| 57 | 0.65 | 0.20 | 0.15 | 0.93 | 0.06 | 1.02 | 1.38 | 1.5 | 0.10 | 0.00 | 0.92 | 0.63 | G | 54 |
| 58 | 0.65 | 0.20 | 0.15 | 0.93 | 0.06 | 1.02 | 1.42 | 1.5 | 0.10 | 0.00 | 0.95 | 0.64 | G | 54 |
| 59 | 0.65 | 0.20 | 0.15 | 0.93 | 0.06 | 1.02 | 1.45 | 1.5 | 0.10 | 0.00 | 0.97 | 0.64 | G | 54 |

TABLE 3

| Sample No. | Initial Short-Circuit | High-Temperature Load Life Electric Field Intensity 75 kV/mm | 100 kV/mm | 125 kV/mm | Moisture Load Life |
|---|---|---|---|---|---|
| 1 | 0/100 | 0/100 | 1/100 | 8/100 | 0/100 |
| 2 | 0/100 | 0/100 | 4/100 | 8/100 | 0/100 |
| 3 | 0/100 | 0/100 | 6/100 | 10/100 | 0/100 |
| 4 | 0/100 | 1/100 | 7/100 | 12/100 | 1/100 |
| * 5 | 7/100 | 13/100 | 36/100 | 98/100 | 100/100 |
| * 6 | 100/100 | 100/100 | 100/100 | 100/100 | 100/100 |
| * 7 | 56/100 | 78/100 | 100/100 | 100/100 | 95/100 |
| 8 | 0/100 | 0/100 | 0/100 | 4/100 | 0/100 |
| 9 | 0/100 | 0/100 | 0/100 | 6/100 | 0/100 |
| * 10 | 45/100 | 66/100 | 100/100 | 100/100 | 94/100 |
| 11 | 0/100 | 0/100 | 0/100 | 6/100 | 0/100 |
| * 12 | 42/100 | 59/100 | 100/100 | 100/100 | 96/100 |
| * 13 | 100/100 | 100/100 | 100/100 | 100/100 | 100/100 |
| 14 | 0/100 | 0/100 | 5/100 | 10/100 | 1/100 |
| 15 | 0/100 | 0/100 | 0/100 | 5/100 | 0/100 |
| * 16 | 64/100 | 94/100 | 100/100 | 100/100 | 100/100 |
| * 17 | 55/100 | 89/100 | 100/100 | 100/100 | 100/100 |
| 18 | 0/100 | 0/100 | 0/100 | 5/100 | 0/100 |
| 19 | 0/100 | 0/100 | 4/100 | 8/100 | 1/100 |
| * 20 | 100/100 | 100/100 | 100/100 | 100/100 | 100/100 |
| * 21 | 54/100 | 100/100 | 100/100 | 100/100 | 100/100 |
| 22 | 0/100 | 0/100 | 0/100 | 6/100 | 0/100 |
| 23 | 0/100 | 0/100 | 0/100 | 5/100 | 0/100 |
| 24 | 0/100 | 0/100 | 1/100 | 5/100 | 0/100 |
| 25 | 0/100 | 0/100 | 0/100 | 6/100 | 0/100 |
| 26 | 0/100 | 0/100 | 0/100 | 5/100 | 0/100 |

TABLE 3-continued

| Sample No. | Initial Short-Circuit | High-Temperature Load Life Electric Field Intensity | | | Moisture Load Life |
|---|---|---|---|---|---|
| | | 75 kV/mm | 100 kV/mm | 125 kV/mm | |
| 27 | 0/100 | 0/100 | 1/100 | 6/100 | 0/100 |
| 28 | 0/100 | 0/100 | 4/100 | 8/100 | 0/100 |
| 29 | 0/100 | 2/100 | 9/100 | 15/100 | 3/100 |
| * 30 | 100/100 | 100/100 | 100/100 | 100/100 | 100/100 |

TABLE 4

| Sample No. | Initial Short-Circuit | High-Temperature Load Life Electric Field Intensity | | | Moisture Load Life |
|---|---|---|---|---|---|
| | | 75 kV/mm | 100 kV/mm | 125 kV/mm | |
| * 31 | 48/100 | 91/100 | 100/100 | 100/100 | 100/100 |
| 32 | 0/100 | 0/100 | 0/100 | 6/100 | 0/100 |
| 33 | 0/100 | 0/100 | 0/100 | 5/100 | 0/100 |
| 34 | 0/100 | 0/100 | 0/100 | 5/100 | 0/100 |
| 35 | 0/100 | 1/100 | 8/100 | 10/100 | 3/100 |
| 36 | 0/100 | 2/100 | 8/100 | 14/100 | 3/100 |
| * 37 | 100/100 | 100/100 | 100/100 | 100/100 | 100/100 |
| * 38 | 0/100 | 52/100 | 78/100 | 100/100 | 75/100 |
| 39 | 0/100 | 1/100 | 0/100 | 3/100 | 2/100 |
| 40 | 0/100 | 0/100 | 0/100 | 6/100 | 0/100 |
| 41 | 0/100 | 0/100 | 0/100 | 5/100 | 0/100 |
| 42 | 0/100 | 0/100 | 0/100 | 6/100 | 0/100 |
| 43 | 0/100 | 0/100 | 0/100 | 7/100 | 0/100 |
| * 44 | 100/100 | 100/100 | 100/100 | 100/100 | 100/100 |
| 45 | 0/100 | 0/100 | 0/100 | 3/100 | 0/100 |
| 46 | 0/100 | 0/100 | 1/100 | 4/100 | 0/100 |
| 47 | 0/100 | 0/100 | 1/100 | 5/100 | 0/100 |
| 48 | 0/100 | 1/100 | 5/100 | 15/100 | 1/100 |
| 49 | 0/100 | 2/100 | 6/100 | 17/100 | 3/100 |
| * 50 | 55/100 | 66/100 | 85/100 | 100/100 | 100/100 |
| ○ 51 | 0/100 | 0/100 | 0/100 | 0/100 | 0/100 |
| ○ 52 | 0/100 | 0/100 | 0/100 | 1/100 | 0/100 |
| ○ 53 | 0/100 | 0/100 | 0/100 | 1/100 | 0/100 |
| ⊙ 54 | 0/100 | 0/100 | 0/100 | 0/100 | 0/100 |
| ⊙ 55 | 0/100 | 0/100 | 0/100 | 0/100 | 0/100 |
| ⊙ 56 | 0/100 | 0/100 | 0/100 | 0/100 | 0/100 |
| 57 | 0/100 | 0/100 | 0/100 | 6/100 | 0/100 |
| 58 | 0/100 | 0/100 | 0/100 | 5/100 | 0/100 |
| 59 | 0/100 | 0/100 | 0/100 | 5/100 | 0/100 |

What is claimed is:

1. A multilayer ceramic capacitor comprising:
a laminate having a plurality of dielectric layers and a plurality of internal electrode layers respectively laminated, and having a first main surface and a second main surface opposed to each other in a lamination direction, a first side surface and a second side surface opposed to each other in a width direction orthogonal to the lamination direction, and a first end surface and a second end surface opposed to each other in a length direction orthogonal to the lamination direction and the width direction, the dielectric layers comprising V and a perovskite type structure containing Ba, Sr, Zr, Ti, and Hf, wherein
(number of moles of Sr)/(number of moles of Ba+number of moles of Sr) is 0.6 to 0.95,
(number of moles of Zr)/(number of moles of Zr+number of moles of Ti+number of moles of Hf) is 0.9 to 0.98,
a thickness of the dielectric layers is 1 μm or less, and
an average particle size of dielectric particles of the dielectric layer is 0.8 μm or less;
a first external electrode covering the first end surface and extending from the first end surface onto the first and second main surfaces and the first and second side surfaces; and
a second external electrode covering the second end surface and extending from the second end surface onto the first and second main surfaces and the first and second side surfaces.

2. The multilayer ceramic capacitor according to claim 1, wherein the dielectric layers further include Ca, and (number of moles of Sr)/(number of moles of Ba+number of moles of Ca+number of moles of Sr) is 0.6 to 0.95.

3. The multilayer ceramic capacitor according to claim 2, wherein the dielectric layers further contain Si and Mn, and Re, wherein
Re is at least one of La, Ce, Pr and Nd,
(number of moles of Ba+number of moles of Ca+number of moles of Sr+number of moles of Re)/(number of moles of Zr+number of moles of Ti+number of moles of Hf) is 1.00 to 1.03,
(number of moles of Ba)/(number of moles of Ba+number of moles of Ca+number of moles of Sr) is 0.05 to 0.40,
(number of moles of Ca)/(number of moles of Ba+number of moles of Ca+number of moles of Sr) is up to 0.35,
(number of moles of Ti)/(number of moles of Zr+number of moles of Ti+number of moles of Hf) is 0.02 to 0.10,
(number of moles of Si)/(number of moles of Zr+number of moles of Ti+number of moles of Hf) is 0.1 to 4.0,
(number of moles of Mn)/(number of moles of Zr+number of moles of Ti+number of moles of Hf) is 0.1 to 4.0,
(number of moles of V)/(number of moles of Zr+number of moles of Ti+number of moles of Hf) is 0.01 to 0.3, and
(number of moles of Re)/(number of moles of Zr+number of moles of Ti+number of moles of Hf) is to 3.0.

4. The multilayer ceramic capacitor according to claim 1, wherein the laminate has a dimension in the length direction of 0.25 mm or less, a dimension in the lamination direction of 0.125 mm or less, and a dimension in the width direction of 0.125 mm or less.

5. The multilayer ceramic capacitor according to claim 1, wherein an average particle size of the dielectric particles is 0.6 μm or less.

6. The multilayer ceramic capacitor according to claim 1, wherein the dielectric layers further contain Si and Mn, and (number of moles of the Si)/(number of moles of the Mn) is 0.8 to 1.0.

7. The multilayer ceramic capacitor according to claim 1, wherein a Cv value represented by (standard deviation of the dielectric-particle size)/(average particle size of the dielectric particle)×100 is 47% or less.

8. The multilayer ceramic capacitor according to claim 1, wherein the dielectric layers further contain Si and Mn, and Re, wherein
Re is at least one of La, Ce, Pr and Nd,
(number of moles of Ba+number of moles of Sr+number of moles of Re)/(number of moles of Zr+number of moles of Ti+number of moles of Hf) is 1.00 to 1.03,
(number of moles of Ba)/(number of moles of Ba+number of moles of Sr) is 0.05 to 0.40,
(number of moles of Ti)/(number of moles of Zr+number of moles of Ti+number of moles of Hf) is 0.02 to 0.10,
(number of moles of Si)/(number of moles of Zr+number of moles of Ti+number of moles of Hf) is 0.1 to 4.0,
(number of moles of Mn)/(number of moles of Zr+number of moles of Ti+number of moles of Hf) is 0.1 to 4.0, (number of moles of V)/(number of moles of Zr+number of moles of Ti+number of moles of Hf) is 0.01 to 0.3, and (number of moles of Re)/(number of moles of Zr+number of moles of Ti+number of moles of Hf) is a to 3.0.

9. The multilayer ceramic capacitor according to claim 1, wherein the dielectric layers do not contain Al.

10. A multilayer ceramic capacitor comprising:
a laminate having a plurality of dielectric layers and a plurality of internal electrode layers respectively laminated, and having a first main surface and a second main surface opposed to each other in a lamination direction, a first side surface and a second side surface opposed to each other in a width direction orthogonal to the lamination direction, and a first end surface and a second end surface opposed to each other in a length direction orthogonal to the lamination direction and the width direction;
a first external electrode covering the first end surface and extending from the first end surface onto the first and second main surfaces and the first and second side surfaces; and
a second external electrode covering the second end surface and extending from the second end surface onto the first and second main surfaces and the first and second side surfaces,
when dissolving the laminate in a solvent, the dielectric layers comprise V and a perovskite structure containing Ba, Sr, Zr, Ti, and Hf, wherein
(number of moles of Sr)/(number of moles of Ba+number of moles of Sr) is 0.6 to 0.95,
(number of moles of Zr)/(number of moles of Zr+number of moles of Ti+number of moles of Hf) is 0.9 to 0.98,
a thickness of the dielectric layers are 1 µm or less, and
an average particle size of dielectric particles of the dielectric layer is 0.8 µm or less.

11. The multilayer ceramic capacitor according to claim 10, wherein the dielectric layers further include Ca, and (number of moles of Sr)/(number of moles of Ba+number of moles of Ca+number of moles of Sr) is 0.6 to 0.95.

12. The multilayer ceramic capacitor according to claim 11, wherein the dielectric layers further contain Si and Mn, and Re, wherein
Re is at least one of La, Ce, Pr and Nd,
(number of moles of Ba+number of moles of Ca+number of moles of Sr+number of moles of Re)/(number of moles of Zr+number of moles of Ti+number of moles of Hf) is 1.00 to 1.03,
(number of moles of Ba)/(number of moles of Ba+number of moles of Ca+number of moles of Sr) is 0.05 to 0.40,
(number of moles of Ca)/(number of moles of Ba+number of moles of Ca+number of moles of Sr) is up to 0.35,
(number of moles of Ti)/(number of moles of Zr+number of moles of Ti+number of moles of Hf) is 0.02 to 0.10,
(number of moles of Si)/(number of moles of Zr+number of moles of Ti+number of moles of Hf) is 0.1 to 4.0,
(number of moles of Mn)/(number of moles of Zr+number of moles of Ti+number of moles of Hf) is 0.1 to 4.0,
(number of moles of V)/(number of moles of Zr+number of moles of Ti+number of moles of Hf) is 0.01 to 0.3, and
(number of moles of Re)/(number of moles of Zr+number of moles of Ti+number of moles of Hf) is up to 3.0.

13. The multilayer ceramic capacitor according to claim 10, wherein the laminate has a dimension in the length direction of 0.25 mm or less, a dimension in the lamination direction of 0.125 mm or less, and a dimension in the width direction of 0.125 mm or less.

14. The multilayer ceramic capacitor according to claim 10, wherein an average particle size of the dielectric particles is 0.6 µm or less.

15. The multilayer ceramic capacitor according to claim 10, wherein the dielectric layer further contains Si and Mn, and (number of moles of the Si)/(number of moles of the Mn) is 0.8 to 1.0.

16. The multilayer ceramic capacitor according to claim 10, wherein a Cv value represented by (standard deviation of the dielectric-particle size)/(average particle size of the dielectric particle)×100 is 47% or less.

17. The multilayer ceramic capacitor according to claim 10, wherein the dielectric layers further contain Si and Mn, and Re, wherein
Re is at least one of La, Ce, Pr and Nd,
(number of moles of Ba+number of moles of Sr+number of moles of Re)/(number of moles of Zr+number of moles of Ti+number of moles of Hf) is 1.00 to 1.03,
(number of moles of Ba)/(number of moles of Ba+number of moles of Sr) is 0.05 to 0.40,
(number of moles of Ti)/(number of moles of Zr+number of moles of Ti+number of moles of Hf) is 0.02 to 0.10,
(number of moles of Si)/(number of moles of Zr+number of moles of Ti+number of moles of Hf) is 0.1 to 4.0,
(number of moles of Mn)/(number of moles of Zr+number of moles of Ti+number of moles of Hf) is 0.1 to 4.0,
(number of moles of V)/(number of moles of Zr+number of moles of Ti+number of moles of Hf) is 0.01 to 0.3, and
(number of moles of Re)/(number of moles of Zr+number of moles of Ti+number of moles of Hf) is up to 3.0.

18. The multilayer ceramic capacitor according to claim 10, wherein the dielectric layer does not contain Al.

19. A slurry comprising a mixture of dielectric ceramic first raw material powders including Ba, Sr, Zr, Ti, and Hf, and a second raw material powder including V, wherein, in the slurry, an agglomerated particle size (D50) of the dielectric ceramic first raw material powders is 150 nm or less.

20. The slurry according to claim 19, wherein, when the dielectric ceramic first raw material powders are mixed to form a perovskite structure, an integration width of a (202) diffraction peak by powder X-ray diffraction of the perovskite structure is 0.28° or less.

* * * * *